(12) United States Patent
Antos et al.

(10) Patent No.: US 9,282,181 B2
(45) Date of Patent: Mar. 8, 2016

(54) EFFICIENT RETRIEVAL OF 4G LTE CAPABILITIES

(71) Applicant: Microsoft Corporation, Redmond, WA (US)

(72) Inventors: Christopher Antos, Bellevue, WA (US); Chuck Reeves, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/221,773

(22) Filed: Mar. 21, 2014

(65) Prior Publication Data

US 2015/0271318 A1    Sep. 24, 2015

(51) Int. Cl.
*H04W 4/12* (2009.01)
*H04M 1/725* (2006.01)
*H04M 1/2745* (2006.01)

(52) U.S. Cl.
CPC .... *H04M 1/72583* (2013.01); *H04M 1/274516* (2013.01); *H04M 1/72525* (2013.01)

(58) Field of Classification Search
CPC ... H04W 4/12; H04L 47/10; H04L 29/08108; H04N 7/15; H04N 7/147
USPC .......... 455/412.1, 414.1; 370/230.1; 348/14.08, 14.01, E07.077
See application file for complete search history.

(56) References Cited

U.S. PATENT DOCUMENTS

| | | | |
|---|---|---|---|
| 8,285,265 B2 | 10/2012 | Wisebourt et al. | |
| 2003/0013483 A1* | 1/2003 | Ausems et al. | 455/556 |
| 2009/0088144 A1 | 4/2009 | Beadle et al. | |
| 2010/0149975 A1* | 6/2010 | Tripathi et al. | 370/230.1 |
| 2012/0239757 A1 | 9/2012 | Firstenberg et al. | |
| 2013/0024536 A1 | 1/2013 | Rybak | |
| 2013/0065585 A1* | 3/2013 | Pelletier et al. | 455/435.1 |
| 2013/0073659 A1 | 3/2013 | Agrawal | |
| 2013/0293664 A1* | 11/2013 | Tsang | H04L 12/1827 348/14.03 |

FOREIGN PATENT DOCUMENTS

WO    2008104236 A1    9/2008

OTHER PUBLICATIONS

Liu, et al., An Empirical Evaluation of Battery Power Consumption for Streaming Data Transmission to Mobile Devices, In Proceedings of the 19th ACM international conference on Multimedia, Nov. 28, 2011, pp. 473-482 (10 pages total).

* cited by examiner

*Primary Examiner* — Charles Appiah
*Assistant Examiner* — Alexander Yi
(74) *Attorney, Agent, or Firm* — Judy Yee; Micky Minhas

(57) ABSTRACT

A mobile device executes a background process under an on demand model that queries a remote service exposed by a mobile broadband network to receive status updates as to the capabilities of devices, such as the ability to stream video, that are associated with contacts that are stored on the mobile device. When a mobile device user invokes an action like using a dialer application that causes a contact to be displayed on the device's user interface (UI) such as in a contact card or contact list format, the background process immediately retrieves status for that contact card or list. While waiting for the status retrieval to complete, the background process will trigger the display of a temporary UI on the mobile device which can show either unknown capabilities status or show the most recently retrieved status that is read out of a cache.

18 Claims, 16 Drawing Sheets

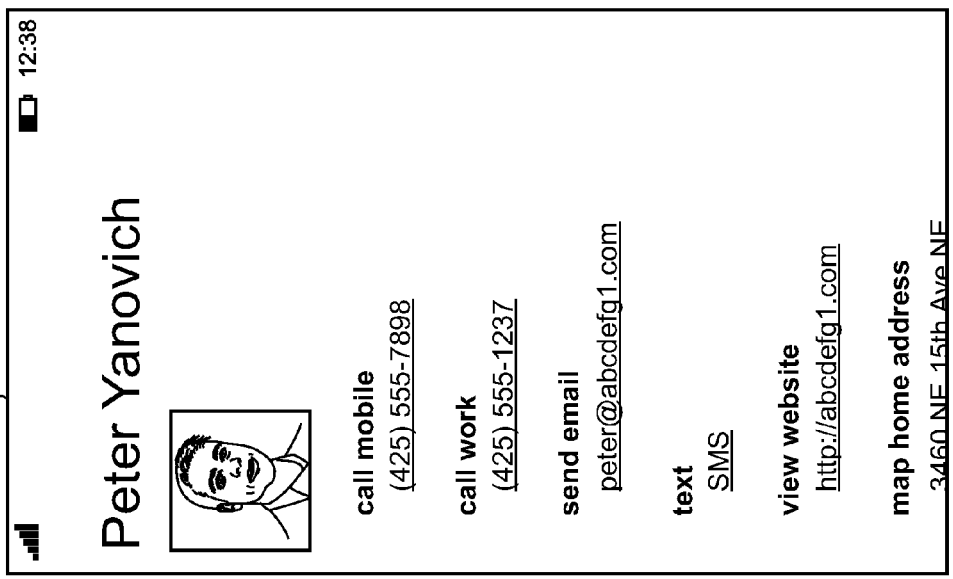
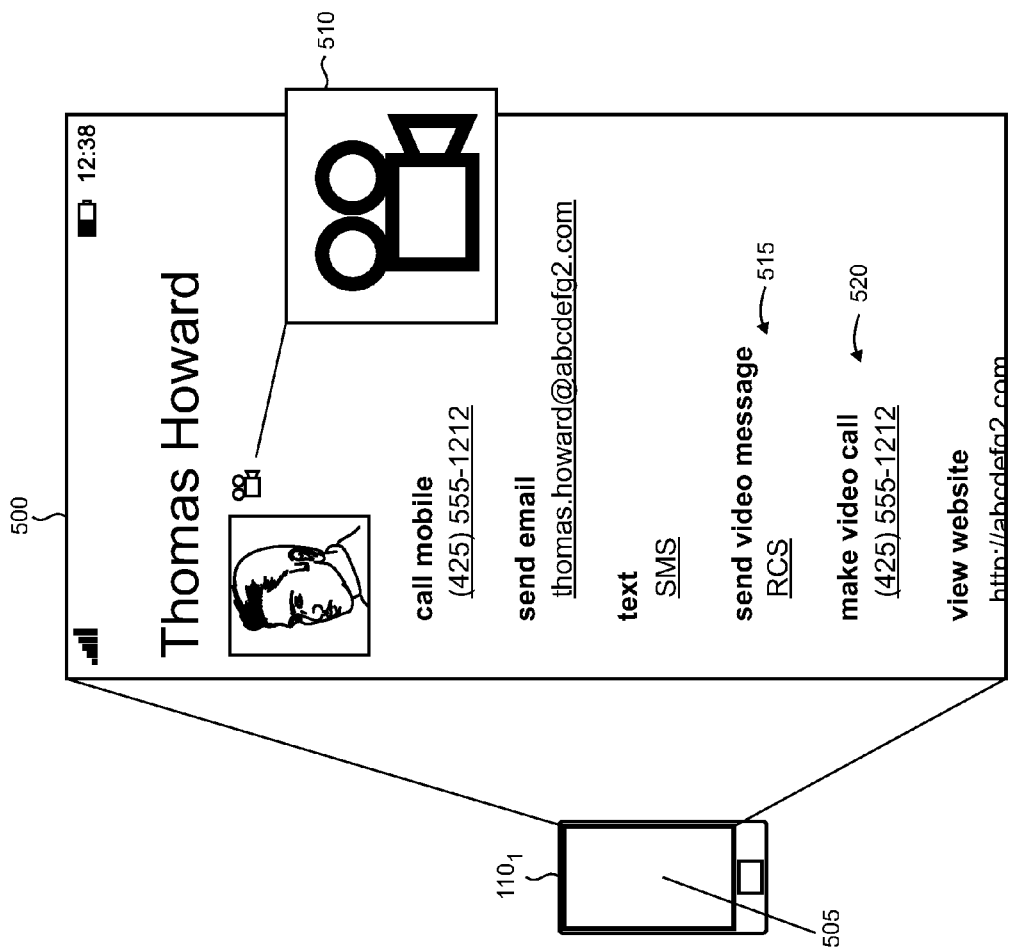

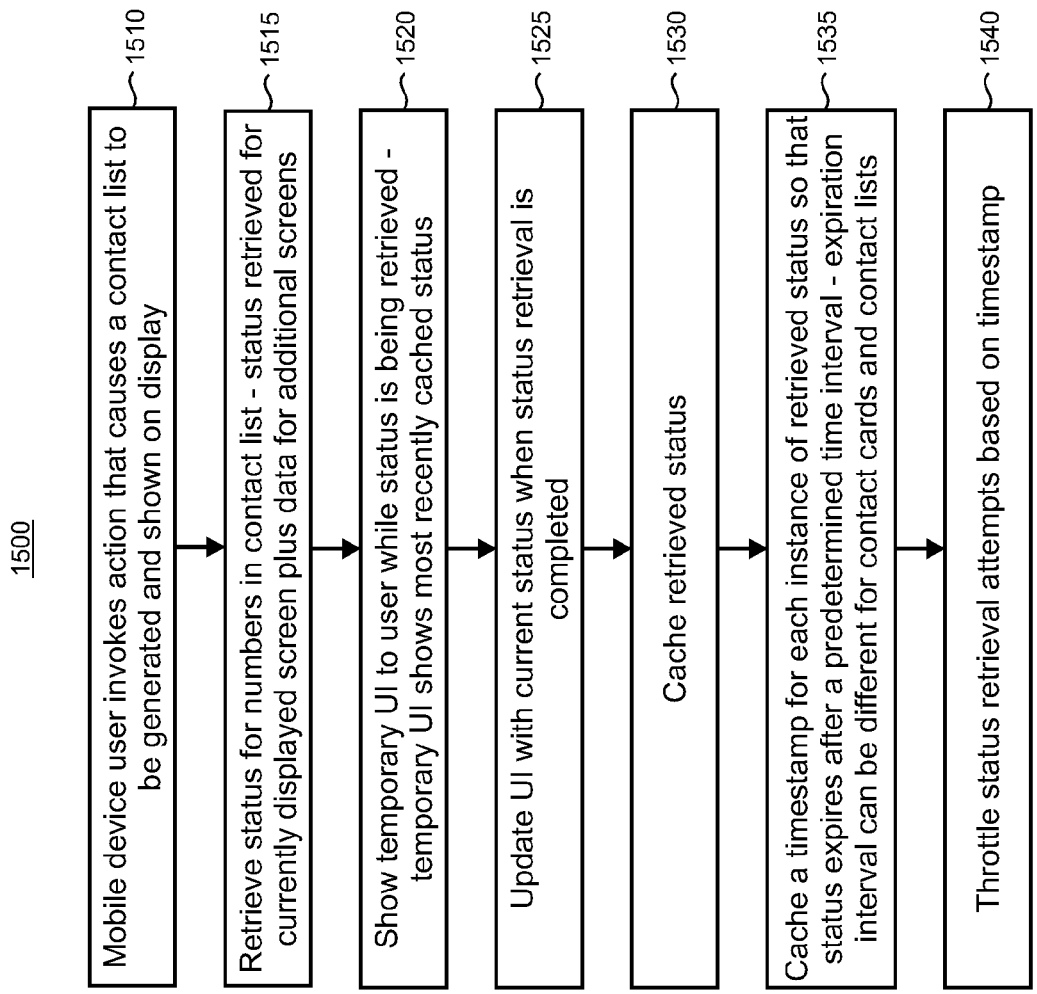

FIG 17

- 1710
- 1700
- 12:38
- 425-555
- Chin, Susan  W (425) 555-3923
- Patel, Deepak  M (425) 555-1755  ← 1720
- Yanovich, Peter  M (425) 555-7898
- Smith, Tyler  H (425) 555-8711
- 1715
- 1705
- Keypad: 1, 2 ABC, 3 DEF, 4 GHI, 5 JKL, 6 MNO, 7 PQRS, 8 TUV, 9 WXYZ, *, 0+, #
- CALL  SAVE

FIG 16

- 1610
- 1600
- 12:38
- 4
- Sewell, Gretchen
- Howard, Thomas  ← 1620
- Massaro, Issac
- Gretzky, Lisa
- 1615
- 1605
- Keypad: 1, 2 ABC, 3 DEF, 4 GHI, 5 JKL, 6 MNO, 7 PQRS, 8 TUV, 9 WXYZ, *, 0+, #
- CALL  SAVE

EFFICIENT RETRIEVAL OF 4G LTE CAPABILITIES

BACKGROUND

Mobile devices are leveraging new communication services on advanced mobile operator (MO) networks that provide broadband services to support rich user experiences such as video messaging and video calling. Such networks may include, for example, 4G LTE (Fourth Generation, Long Term Evolution) systems as described by the 3GPP (Third Generation Partnership Project) as an evolution of the GSM/UMTS (Global System for Mobile communication/Universal Mobile Telecommunications System) standards. While such advanced mobile broadband networks perform satisfactorily in many applications, further improvements are desired to enable additional features and improved experiences for mobile device users.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A mobile device executes a background process under an on demand model that queries a remote service exposed by a mobile broadband network, such as a 4G LTE network, to receive status updates as to the capabilities of devices that are associated with contacts that are stored on the mobile device. Such capabilities can include the availability of a contact's device to support streaming video, for example, as part of video messaging and video calling features. When a mobile device user invokes an action like using a dialer application that causes a contact to be displayed on the device's user interface (UI) such as in a contact card or contact list format, the background process immediately retrieves status for that contact card or list. While waiting for the status retrieval to complete, the background process will trigger the display of a temporary UI on the mobile device which can show either unknown capabilities status or show the most recently retrieved status that is read out of a cache.

Advantageously, the retrieval of capabilities status under the on demand model enables resource costs to be incurred that are more proportional to the number of contacts that a user is actually going to access. Compared with other techniques such as proactively querying the service on a periodic basis and pulling down current status for all of the contacts just in case it is needed, the present capability retrieval can reactively obtain status from the service on demand when the user accesses a contact card or a contact list. Thus, the UI provides up to date status for contact cards and lists viewed by the user on the mobile device while minimizing the use of resources such as battery life.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 5 and 6 depict illustrative user interfaces for two different contact cards;

FIG. 15 is a flowchart of an illustrative method that implements a retrieval in lists option under the on demand model;

FIGS. 16 and 17 show illustrative UIs that show contacts presented in lists;

Like reference numerals indicate like elements in the drawings. Elements are not drawn to scale unless otherwise indicated.

DETAILED DESCRIPTION

Figure 1:
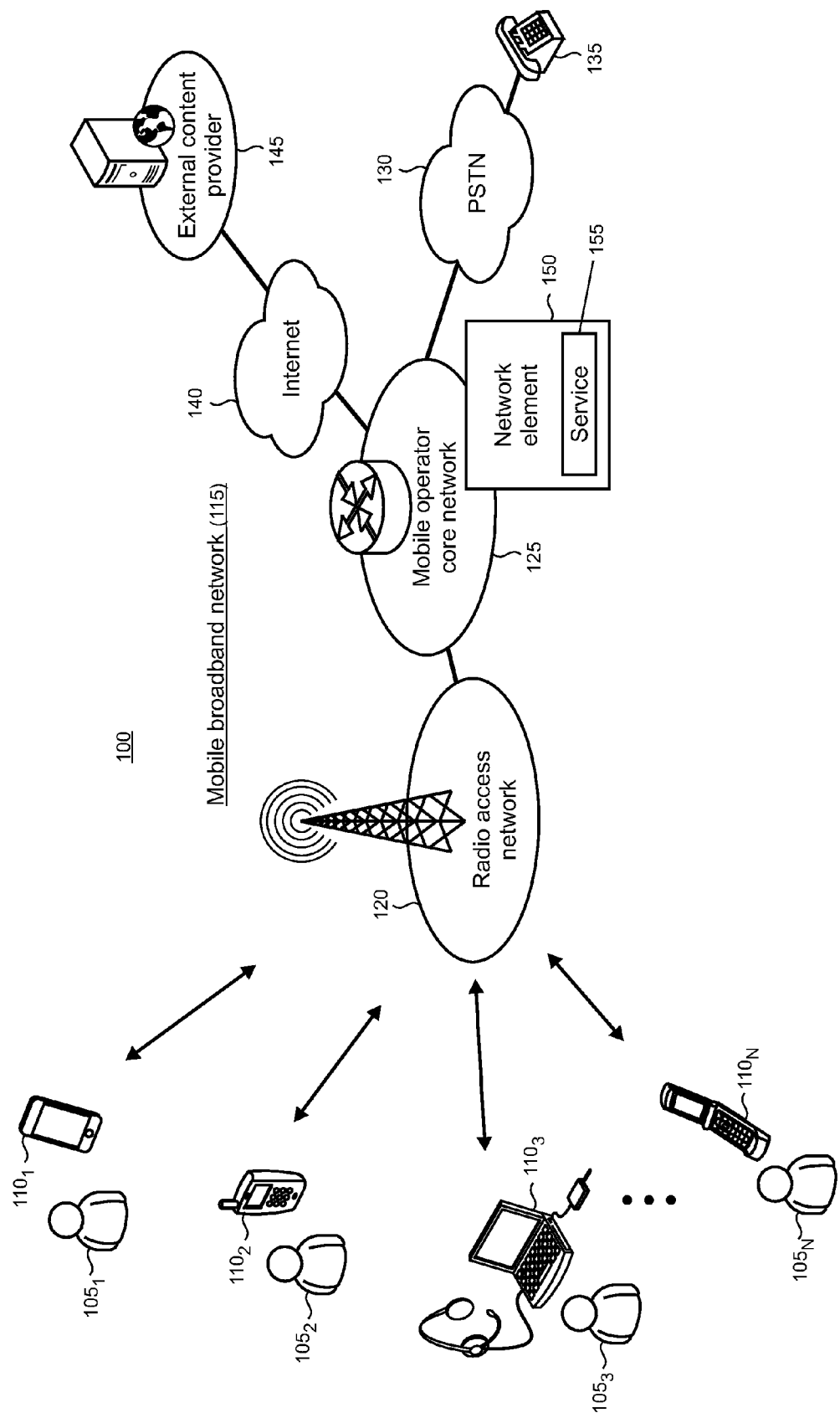
FIG. 1 shows an illustrative telecommunications environment in which devices having telephony capabilities communicate over a mobile broadband network.

FIG. 1 shows an illustrative telecommunications environment 100 in which various users 105 employ respective devices 110 that communicate over a mobile broadband network 115. The devices 110 provide voice telephony capabilities and typically support data-consuming applications such as Internet browsing and multimedia (e.g., music, video, etc.) consumption in addition to various other features. The devices 110 may include, for example, user equipment, mobile phones, cell phones, and smartphones which users often employ to make and receive voice and/or multimedia calls.

However, alternative types of electronic devices are also envisioned to be usable within the telecommunications environment 100 so long as they are configured with telephony capabilities and can connect to the mobile broadband network 115, as described in more detail below. Such alternative devices variously include handheld computing devices, PDAs (Personal Digital Assistants), portable media players, wearable computers, navigation devices such as GPS (Global Positioning System) systems, laptop PCs (personal computers) desktop computers, multimedia consoles, gaming systems, or the like. In the discussion that follows, the use of the term "mobile device" is intended to cover all devices that are configured with telephony capabilities and are capable of wireless connectivity to the mobile broadband network 115.

Each mobile device 110 will typically have a prearranged association with the mobile broadband network 115. For example, a user 105 will typically be a subscriber to a cellular service plan so that the user's mobile device 110 can access the mobile broadband network as valid and authenticated user equipment. The mobile broadband network 115 in this illustrative example is configured as a 4G LTE network which includes a radio access network 120 having a number of macrocells that support access by the devices 110 to a mobile operator (MO) core network 125. The backend of the mobile broadband network 115 typically includes interfaces that support a connection to network infrastructure including a public switched telephone network (PSTN) 130 so that communication is enabled between the mobile device 110 and conventional wireline user equipment 135. A connection to the Internet 140 is also typically supported so that the mobile devices 110 can access content provided by one or more external content providers 145. A network element 150 is located in the MO core network 125 which exposes a service 155 that may be configured to provide status regarding particular capabilities of the devices 110 as described in more detail below.

Figure 2:
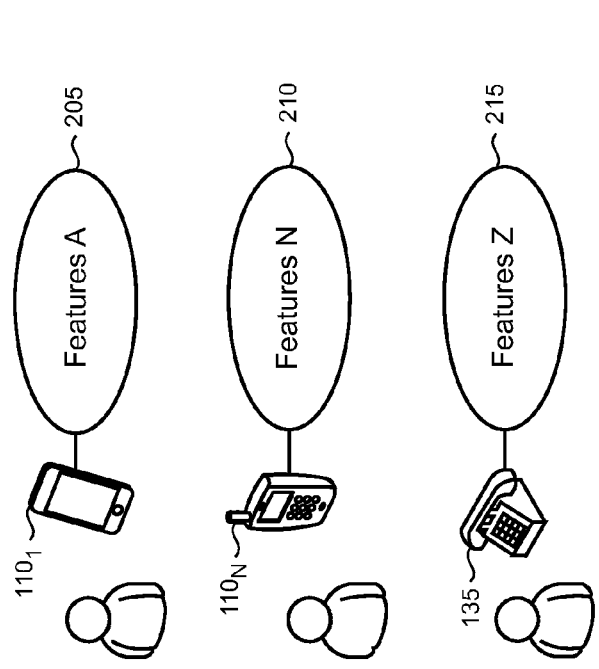
FIGS. 2 and 3 show various features that may be supported on different mobile devices.
Figure 3:
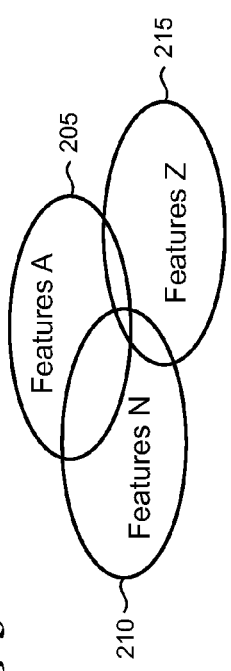

The various mobile devices 110 and wireline equipment 135 in the telecommunications environment 100 can support different features, functionalities, and capabilities (here referred to generally as "features"). For example, various types of equipment support their own feature set, as indicated by respective reference numerals 205, 210, and 215 in FIG. 2. As shown in FIG. 3, some of the features supported on a given device can be similar to those supported on others, while other features may be unique to a given device. The degree of overlap and/or distinctiveness among features supported on the various mobile devices 110 can vary by implementation. For example, some devices 110 can support touch controls, gesture recognition, and voice commands, while others may enable a more limited user interface (UI). Some devices may support video consumption and Internet browsing, while other devices may support more limited media handling and network interface features.

Some features may not be available on a device because of technical reasons. For example, a mobile device might include support for voice calling but is not equipped to handle video due to technical reasons such as various hardware, software, and/or firmware constraints that are imposed by design. In other situations, a given feature may be capable of support by the technology in the mobile device, but the features are disabled for non-technical reasons such as personal preference, business, and/or policy reasons. For example, a user 105 may wish to disable video handling and streaming to a mobile device so as to reduce the expense for data access that is part of a subscription package to MO services. Or, an enterprise or business may wish to restrict execution of some applications or limit access to some external content providers for its corporate users.

Features may also be subject to availability based on temporal and/or environment conditions. For example, a user 105 may wish to consume a streaming video on a mobile device 110 that can normally handle video but the device is near the monthly data cap that is part of the user's subscription. Or, the user may be on a train that is going through a tunnel and has no cellular access or be in an area that supports only voice calling but not data access on the mobile broadband network 115.

Figure 4:
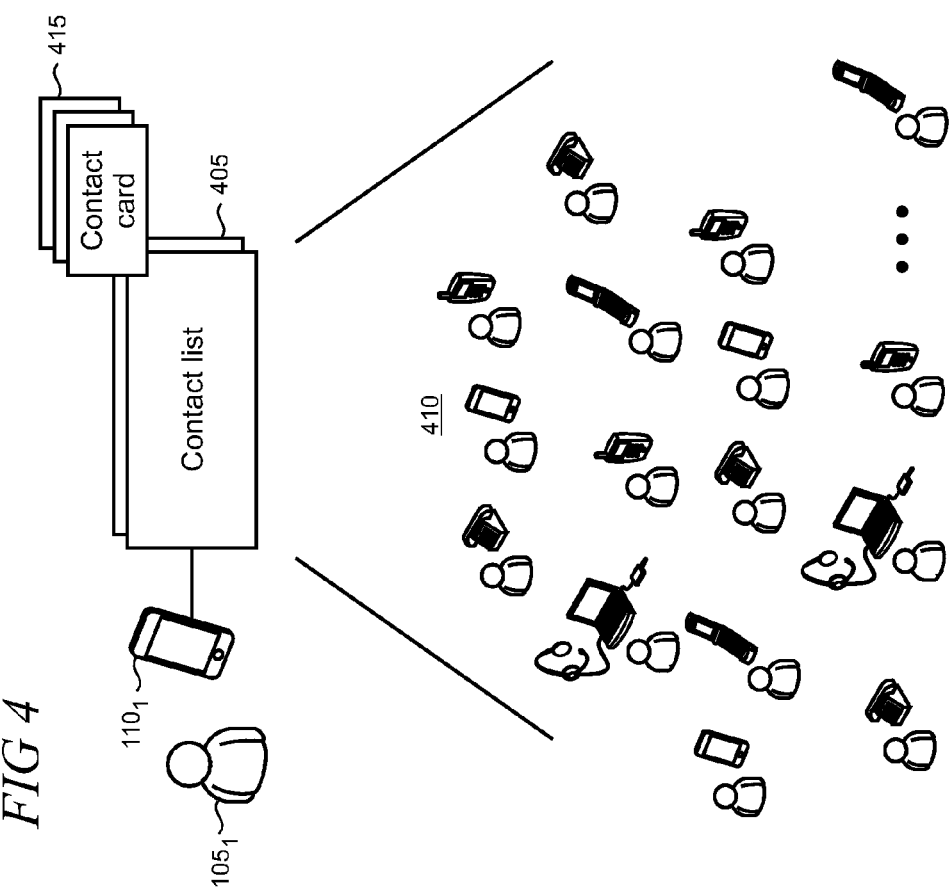
FIG. 4 depicts illustrative contact lists and contact cards that may be stored and displayed on a mobile device.

One particular example of a feature supported on a mobile device is shown in FIG. 4 in which information about contacts are stored. As shown, a given mobile device 110 may organize the stored information using one or more contact lists 405 that represent information about the group of contacts 410. Some of the contacts 410 may be subscribers to the mobile broadband network 115, while other contacts 410 can be subscribers or otherwise associated with other networks (e.g., other telephony networks, mobile networks, PSTNs, etc.). Each contact list 405 typically comprises a collection of contact cards where each card 415 is used to store information about a particular user (or institution, organization, business, etc.) such as contact name and picture, telephone numbers for mobile, work, home, etc., personal and work email addresses, home and office addresses, websites, significant other's and children's names, birthdays, and the like.

FIG. 5 depicts an illustrative example of a contact card 500 as may be shown on a display 505 of a mobile device 110. It is emphasized that the contact cards shown and described here, and their layout and designs are intended to be illustrative and that variations in how a contact card is presented, the information it contains, and the ways the user can interact with a contact card can vary from that shown and described in accordance with the needs of a particular implementation of video capability retrieval.

In this example various information about a contact named "Thomas Howard" is provided on a UI supported on the display screen. The user 105 (not shown) can interact with the UI here by touching the screen at appropriate locations to launch various actions from the contact card 500 such as placing a call to a contact's mobile phone, sending him a text or email, etc. Additional information can typically be revealed by using the touchscreen to scroll (e.g., up/down, side-to-side) to other places on the contact card 500. Thus, the contact card 500 may contain collective information about the contact that is more extensive that can be shown at one time on a single UI screen. The additional information that is available but not currently displayed is organized into virtual screens or pages (collectively referred to here as "screens"), where each screen can be loaded for display on the UI in response to the user's scrolling actions. It is emphasized that the particular scrolling UI with accessible virtual screens shown in the example herein and the user interaction therewith is intended be illustrative and that other UI designs and behaviors may be utilized to meet the needs of a particular implementation of the present video capability retrieval.

As shown in FIG. 5 and in enlarged view, a glyph 510 is displayed near the contact's photo to indicate to the user that the contact is associated with a mobile device that currently supports broadband video capability over the mobile broadband network 115 (FIG. 1). In addition, certain features are enabled on the contact card 500 including sending a video message, indicated by reference numeral 515, and making a video call to the contact's mobile number, indicated by reference numeral 520. The video message is shown as using the emerging RCS (Rich Communication Service) which is a service offering supported by the MO in this example that has similarity to conventional SMS (Short Message Service) and MMS (Multimedia Message Service) services which are typically and ubiquitously supported today.

In comparison to the contact card 500 shown in FIG. 5, the contact card 600 shown in FIG. 6 for a contact named "Peter Yanovich" does not display the video glyph nor does its UI enable video features such as video-based messaging and calling. Thus, in this example, the contact card 600 indicates to the user 105 that the contact currently is not able to reached and communicated using video features. As described above, there could be various reasons for the limited availability of video features for that particular contact. For example, the contact may not have a video-capable mobile device, has chosen not to enable video features, is not presently in an area of network coverage that supports broadband data access, or the like.

The status as to the availability of features on each of the mobile devices in the user's contacts 410 (FIG. 4) may be obtained in various ways. For example, a given mobile device 110 may query the service 155 in the MO's mobile broadband network 115 on a periodic basis to request status as to feature support and capabilities (collectively referred to here as "status"), including video capability, for each device associated with each contact. While such periodic background bulk retrieval enables the UI on the device 110 to show a cached status that is current as of the last status update, battery drain increases as retrieval frequency increases, as as does the impact on other mobile device resources such as processing cycles and memory utilization. Battery drain is also likely to occur at higher than direct proportion to status retrieval frequency due to overhead cost of initializing and operating the mobile device's radio. However, staleness of status increases as frequency decreases, and at some average level of staleness performing the periodic background bulk status retrieval is no longer worthwhile.

A supplementary solution to periodic bulk retrieval is to initiate an immediate retrieval of a single instance of status when the user opens a particular contact card on the device's UI. The UI in this case can initially reflect cached status from the most recent periodic background bulk retrieval, but then can be quickly refreshed to show current status from the initiated single instance retrieval. Battery drain versus staleness could potentially be balanced by tuning the frequency of periodic bulk status retrieval.

Unfortunately, for many users it can be expected that bulk retrieval with or without immediate retrieval of status can still be less than optimally performant in many scenarios. For example, if the bulk retrieval frequency is once every 60 minutes, and a user visits the contact cards only 10 times per month, the mobile device will still do 720 periodic background bulk retrievals covering everyone in the user's group of contacts. In addition, it has been observed that the more contacts a user has the less likely it is for a given number's status to be needed. In some cases users have 2,000 or more contacts. The popularity of social networking systems and other online resources makes it quite easy to have a large contact list, but it is unlikely that users regularly interact with most of their contacts. Thus, the resource costs in retrieving status using the solutions described above can be prohibitive.

The present video capability retrieval enables resource costs to be incurred that are more proportional to the number of contacts that a user is actually going to access. Instead of proactively querying the service on a periodic basis and pulling down current status for all of the contacts just in case it is needed, the present video capability retrieval can reactively obtain status from the service on demand when the user accesses a contact card or a contact list.

Figure 7:
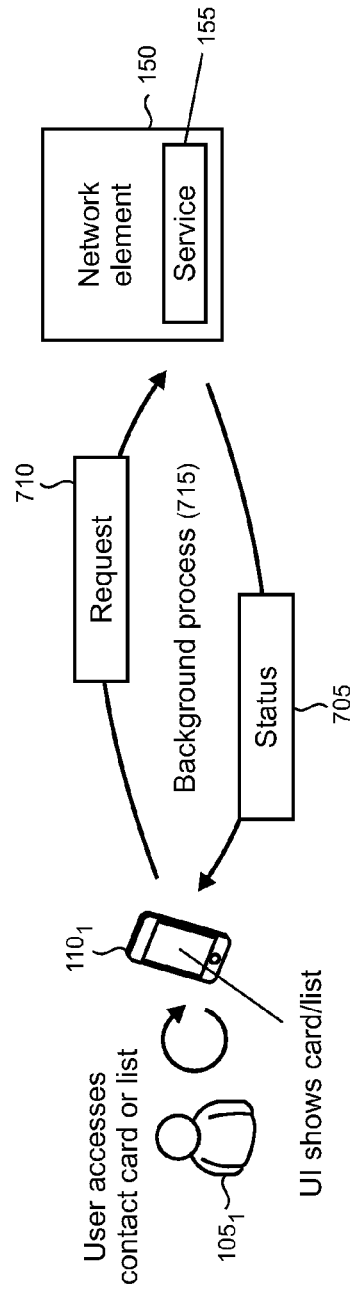
FIG. 7 shows an illustrative background process for status retrieval using an on demand model for status retrieval.

An on demand model 700 is utilized as shown in FIG. 7. In summary, the on demand model 700 is implemented on a mobile device 110 so that when the user accesses a contact card or a contact list, status 705 is retrieved from the service 155 in response to a request 710 using a background process 715 or thread that is implemented by functionality that is provided, for example, by an application or operating system that executes on the mobile device.

When a contact list is accessed by the user and displayed, the on demand model calls for status to be retrieved for additional contacts in virtual pages or screens beyond those contacts that are currently displayed on the UI. That way, some status data is pre-fetched in case it is needed to be displayed for the user or is given prioritization for retrieval over other data (here, pre-fetched and prioritized status data is commonly referred to as "pre-fetched status"). The pre-fetched status in accordance with the on demand model is contextually related with the contacts that are currently being accessed by the user, as described in more detail below. The use of such contextual relationship enables the pre-fetched status under the on demand model to have greater potential relevance to the user while reducing the amount of retrieval of less relevant data (and accordingly reducing the load on resources). The on demand model thus stands in contrast with the aforementioned bulk retrieval technique where large amounts of data may be retrieved irrespective of its likelihood that it is actually accessed by the user.

Figure 9:
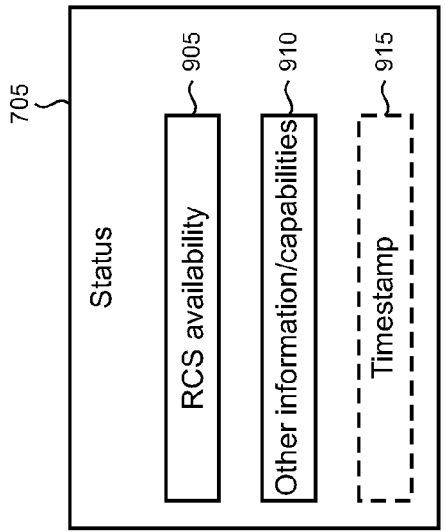
FIG. 9 shows illustrative details of a status response under the on demand model.
Figure 8:
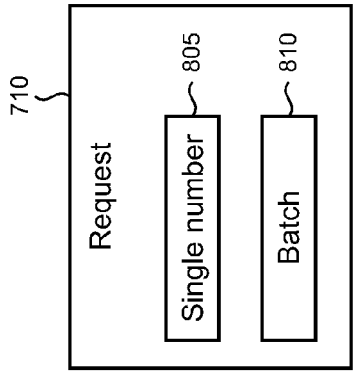
FIG. 8 shows illustrative details of a request for status under the on demand model.

As shown in FIG. 8, the request 710 for status can comprise a single number 805 or a batch of numbers 810. The term "number" here typically refers to the telephone number that is uniquely associated with a mobile device or other device having telephony capabilities. For example, the number may comprise the 10 digit string including area code in the United States or comprise the MSISDN (Mobile Subscriber Integrated Services Digital Network) or IMSI (International Mobile Subscriber Identity) in some cases. As shown in FIG. 9, the status 705 sent by the service 155 as a response to the request 710 includes current RCS availability 905 per number. Additional information per number, such as capabilities of a mobile device other than RCS, can also be included in the status 705 in some implementations, as indicated by reference numeral 910. In some cases, the service may optionally provide a timestamp 915 in the status 705. Alternatively, the mobile device 110 and/or the background process 715 may apply its own timestamp when the status is received.

Figure 10:
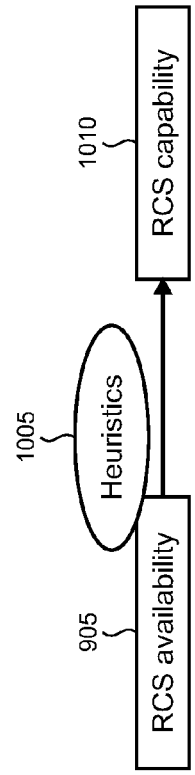
FIG. 10 shows application of heuristics to RCS (Rich Communication Services) availability information.

The current RCS availability 905 reported by the service 155 in the status 705 for a given number can be analyzed using another process or thread that executes on the mobile device 110. As shown in FIG. 10, various heuristics 1005 may be applied to the RCS availability 905 in order to estimate RCS capabilities 1010 (and/or non-RCS capabilities in some cases) in a broader sense. In an illustrative example, the RCS availability of a number over time can be analyzed to generate historical data. The analysis can thus enable some prediction to be made as to the likelihood that a contact has video capability at any given point in time. For example, the historical data could tend to show that a contact does not have video capabilities at certain times of night perhaps because the mobile device is shut off or the user does not wish to be disturbed. In another example, the analysis may indicate a high probability that a particular mobile device has video capability based on its past history of RCS availability.

Figure 11:
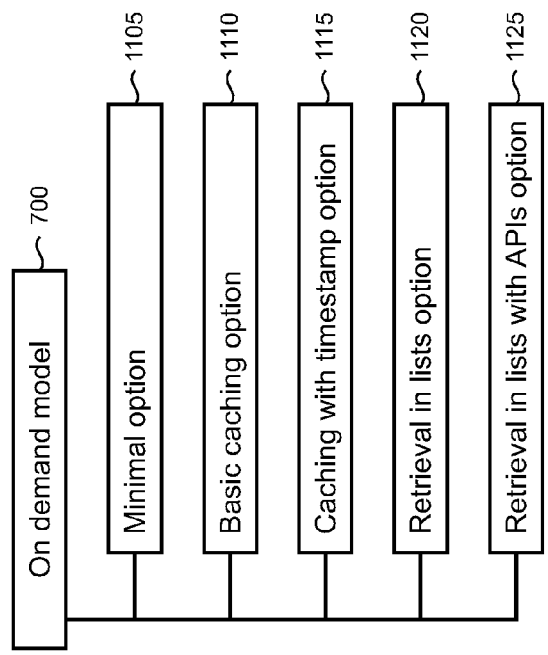
FIG. 11 shows an illustrative taxonomy of options that may be implemented under the on demand model.

The present on demand model for efficiently retrieving video capability may be implemented using a tiered approach, as shown in FIG. 11, in which different options may be utilized depending on the particular needs of a given implementation. These include a minimal option 1105, a basic caching option 1110, a caching with timestamp option 1115, a retrieval in lists option 1120, and a retrieval in lists with APIs (Application Programming Interfaces) option 1125. Each successive option builds on the others which advantageously enables reduced development time for deployments using the present on demand model since software code in the minimal option is reused in substantial part in the basic caching option, which is reused in the caching with timestamp option, and so on. It is noted that contact lists are commonly supported in many mobile devices, hence it can be expected that the retrieval in lists option 1120 and the retrieval in lists with APIs option 1125 will be utilized in many typical deployments. The other options (i.e., minimal, basic caching, and caching with timestamp) are typically more suited to deployments in which the UI on a mobile device shows individual contact cards and does not show contact lists.

Figure 12:
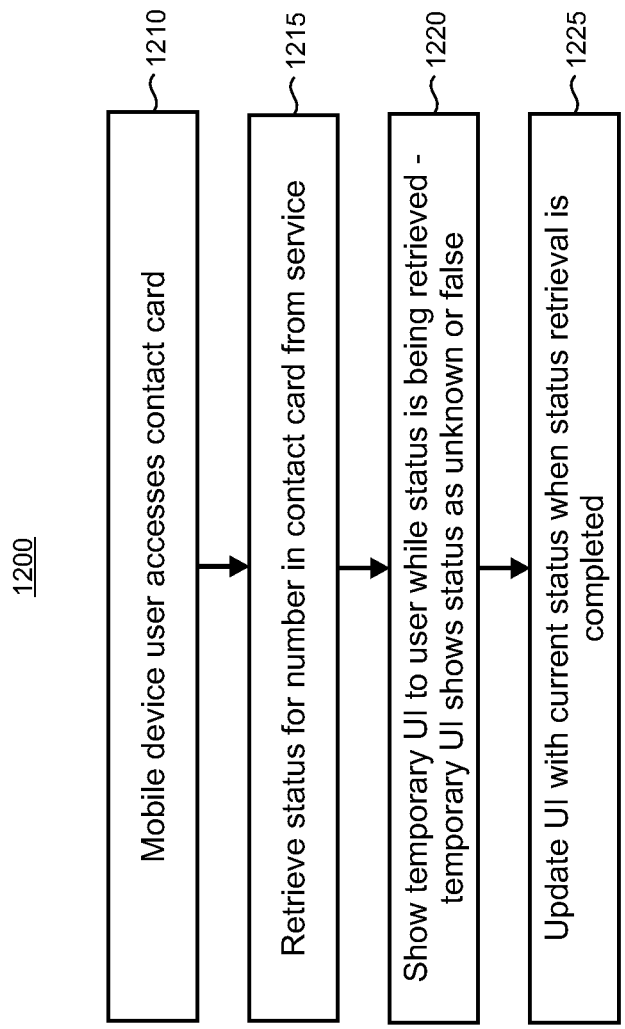
FIG. 12 is a flowchart of an illustrative method that implements a minimal option under the on demand model.

FIG. 12 is a flowchart that depicts an illustrative method 1200 for implementing the minimal option 1105 (FIG. 11). Unless specifically stated, the methods or steps shown in the flowcharts contained herein and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1210, a mobile device user 105 (FIG. 1) opens a contact card that is stored on the mobile device 110. In step 1215, the background process 715 (FIG. 7) retrieves status for the number in the contact card from the service 155 (FIG. 1). While waiting for the status retrieval to finish, a temporary UI is shown on the device's display screen in step 1220. The temporary UI can either show that the status for the contact is currently unknown or that the status is false (i.e., that no video capability is presently supported for the contact). The UI is then updated with current status when the status retrieval from the service is completed in step 1225.

Figure 13:
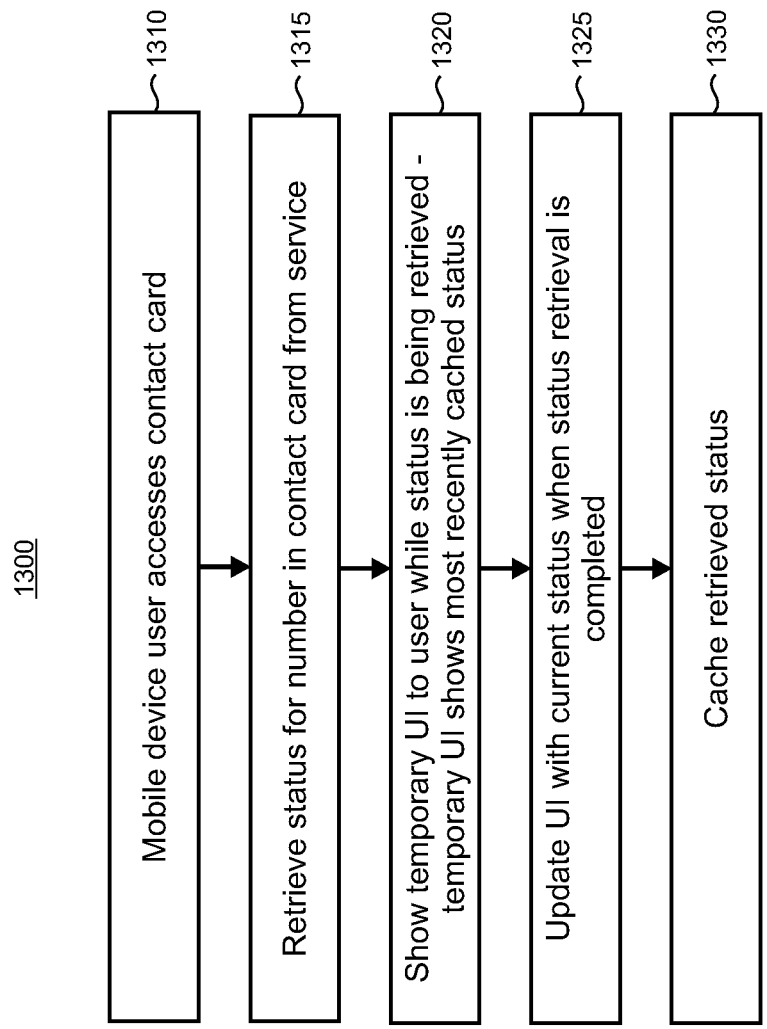
FIG. 13 is a flowchart of an illustrative method that implements a basic caching option under the on demand model.

FIG. 13 is a flowchart that depicts an illustrative method 1300 for implementing the basic caching option 1110 (FIG. 11). Steps 1310 and 1315 are the same as steps 1210 and 1215 in method 1200 shown in FIG. 12 and described in the accompanying text. In step 1320, while waiting for the status retrieval to finish, a temporary UI is shown using the most recently cached status (for the initial condition in which status is not cached, the UI can show unknown or false status as in the minimal option). The UI is then updated with current status when the status retrieval from the service is completed in step 1325 and the retrieved status is cached in memory in the mobile device 110 in step 1330 for future use (i.e., subsequent instances of access to the contact card by the user 105).

Figure 14:
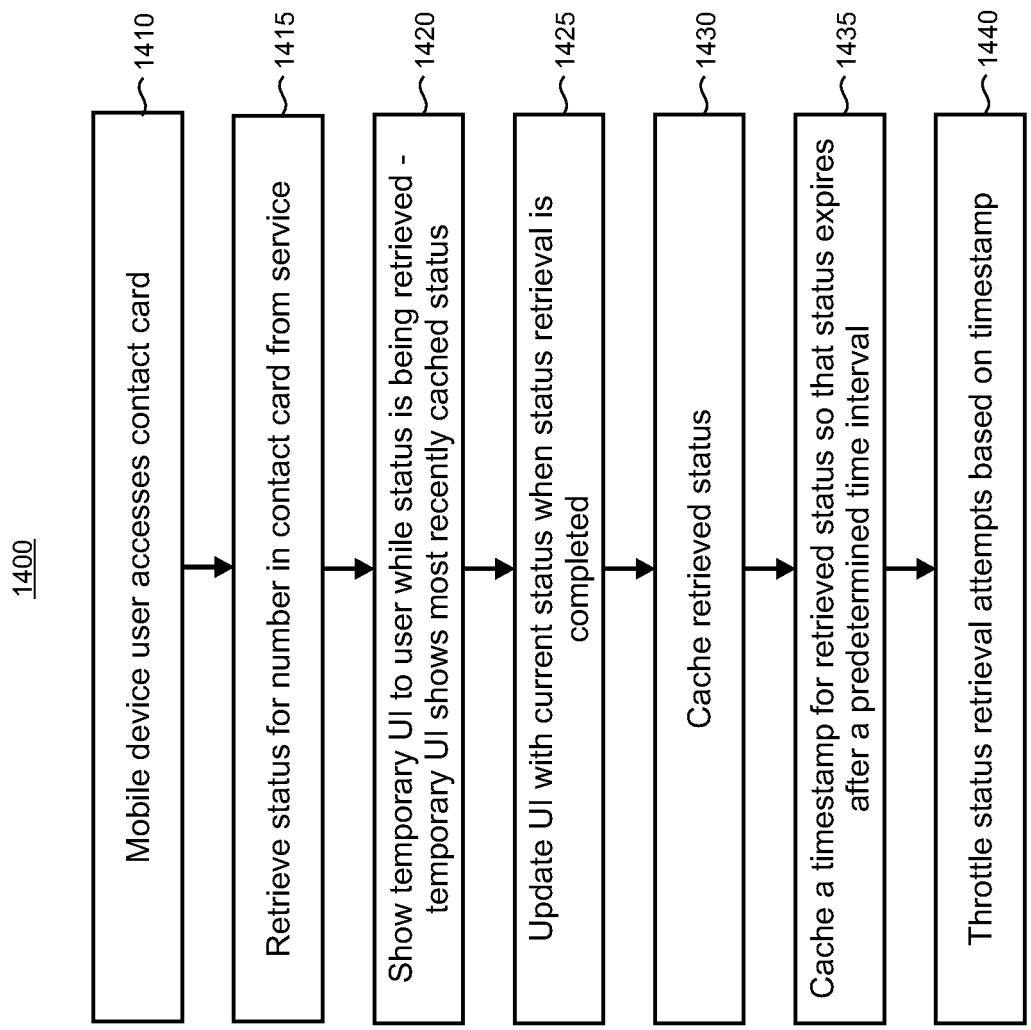
FIG. 14 is a flowchart of an illustrative method that implements a caching with timestamp option under the on demand model.

FIG. 14 is a flowchart that depicts an illustrative method 1400 for implementing the caching with timestamp option 1115 (FIG. 11). Steps 1410 through 1430 are the same as steps 1310 through 1330 in method 1300 shown in FIG. 13 and described in the accompanying text. In step 1435, a timestamp for the retrieved status is cached by the background process 715 (FIG. 7) on the mobile device 110. As described above, the timestamp can be generated by the service 155 and included as part of the status 705 or be generated by the background process 715 when the status is received, or by another process, thread, or application that executes on the mobile device.

The cached timestamp may be utilized to enable the status to automatically expire after some predetermined time interval. The length of the time interval can vary according to the needs of a particular implementation. Generally, a longer time interval prior to status expiration means that a smaller number of retrievals are utilized which can preserve resources, but there is a risk with longer intervals that the status becomes stale and does not accurately reflect the video capabilities of a contact. In step 1440, status retrieval attempts may be throttled using the timestamp so that status retrieval for a contact will not be attempted so long as the status of the contact of interest remains valid (i.e., unexpired).

FIG. 15 is a flowchart that depicts an illustrative method 1500 for implementing the retrieval in lists option 1120 (FIG. 11). In step 1510, the mobile device user 105 invokes an action that causes a contact list to be generated and shown on the UI supported on the mobile device's display 505 (FIG. 5). Any of a variety of actions can typically cause the mobile device to show contacts in a list format on the display. For example, the user may invoke a contacts application on the mobile device in order to browse all stored contacts, in which case the application will often show groups of contacts on each of several screens. The user may navigate from screen to screen to browse the contacts by scrolling or using other actions.

Another example includes the user invoking a dialer application in order to place a voice call. FIG. 16 shows a screenshot of an illustrative UI 1600 exposed by a dialer application that executes on a mobile device 110. In this example, the dialer application provides a virtual keypad 1605 on the lower portion of the display (which is configured as a touchscreen display here). The dialer application in this example is configured as a predictive or "smart" dialer that is designed to save key presses and reduce the amount of user input needed to place the call. The UI includes a digit display 1610 towards the top of the display where, in this example, the user 105 has entered the digit "4." The predictive dialer has been configured to interpret this digit "4" using its assigned text representation of the letters "G," "H," and "I." Accordingly, the predictive dialer shows a list 1615 of contacts having either first or last names that start with one of these letters.

This particular UI 1600 is designed to show four contacts at a time above the keypad 1605 and below the digit display 1610 (other UI designs can vary in the number of contacts that are shown at the same time). The four contacts thus constitute one screen of the full list of contacts that meet the criteria of first or last names starting with the letters "G," "H," or "I." As it is possible that the list of contacts meeting such criteria has more than four members, additional contacts may typically be viewed on the UI by scrolling or using other actions in order to reveal additional screens that are shown on the display. In a similar manner to that shown in FIG. 5, video glyphs (representatively indicated by reference numeral 1620) are displayed on the UI next to contacts that are associated with devices that have video capability based on cached or retrieved status.

FIG. 17 depicts another UI 1700 that shows a contact list 1715 that is generated in response to the user 105 engaging with a predictive dialer application on the mobile device 110. In this example, the user has pressed a sequence of digits using the keypad 1705 that are shown as a string in the digit display 1710. Contacts having phone numbers that include the digit string as entered are displayed in the list 1715. Similarly to the above example, any additional contacts having phone numbers that meet these criteria may be accessed on other screens. In addition, video glyphs (representatively indicated by reference numeral 1720) are shown next to contacts having mobile devices that support video capability based on cached or retrieved status.

Returning to FIG. 15, after the mobile device user invokes an action that causes a contact list to be shown, such as using the smart dialer as shown in FIGS. 16 and 17, the background process in step 1515 makes a batch request to retrieve status from the service 155 for each of the contacts currently being displayed. The background process in this step 1515 will also retrieve status for additional screens of contacts in the list to pre-fetch data that the user may wish to see, for example by scrolling the UI. The criteria that may be applied when retrieving additional status are described below in the text accompanying FIG. 20.

In step 1520, a temporary UI is shown on the mobile device's display while waiting for the status retrieval to finish using the most recently cached status for the contacts in the list that is shown. Accordingly, the background process 715 (FIG. 7) will typically prioritize retrieval of the status for contacts being currently shown over the retrieval of status for the additional screens. The UI is updated with current status when the status retrieval from the service is completed in step 1525 and the retrieved status is cached in memory in the mobile device 110 in step 1530 for future use.

In step 1535, a timestamp for the retrieved status for each contact is cached by the background process 715 on the mobile device 110. The cached timestamp may be utilized to enable the status to automatically expire after some predetermined time interval. Contact cards and contact lists can have different expiration intervals. For example, status for a contact card may expire in one minute while status for a contact list may expire in 15 minutes (these time intervals are intended to be illustrative and other expiration intervals can be used to meet the needs of a particular implementation). In step 1540, status retrieval attempts may be throttled using the timestamp so that status retrieval for a contact will not be attempted so long as the status of the contact card or contact list of interest remains valid (i.e., unexpired).

The UIs 1600 and 1700 shown in FIGS. 16 and 17 are typically arranged to enable the user 105 to select a contact from a contact list (e.g., contact lists 1615 and 1715) and then place the call. For example, by touching the picture or name of the contact to select it, the user may place the call by touching the call button at the bottom of the keypad. Alternatively, the user may select a contact and place a call using a voice command or non-touch gesture in some implementations.

Figure 18:
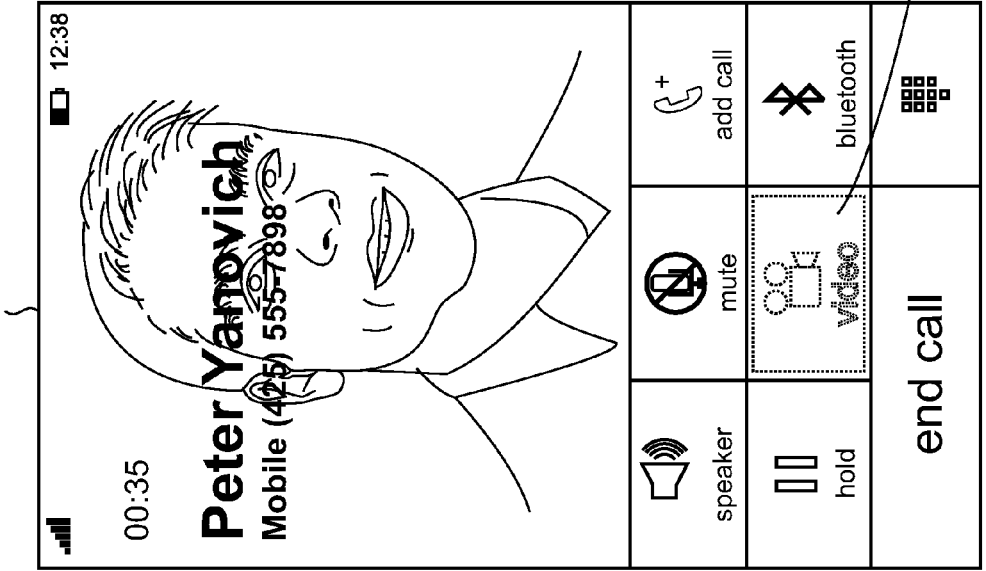
FIGS. 18 and 19 show illustrative UIs in which video functionality is respectively enabled and disabled.
Figure 19:
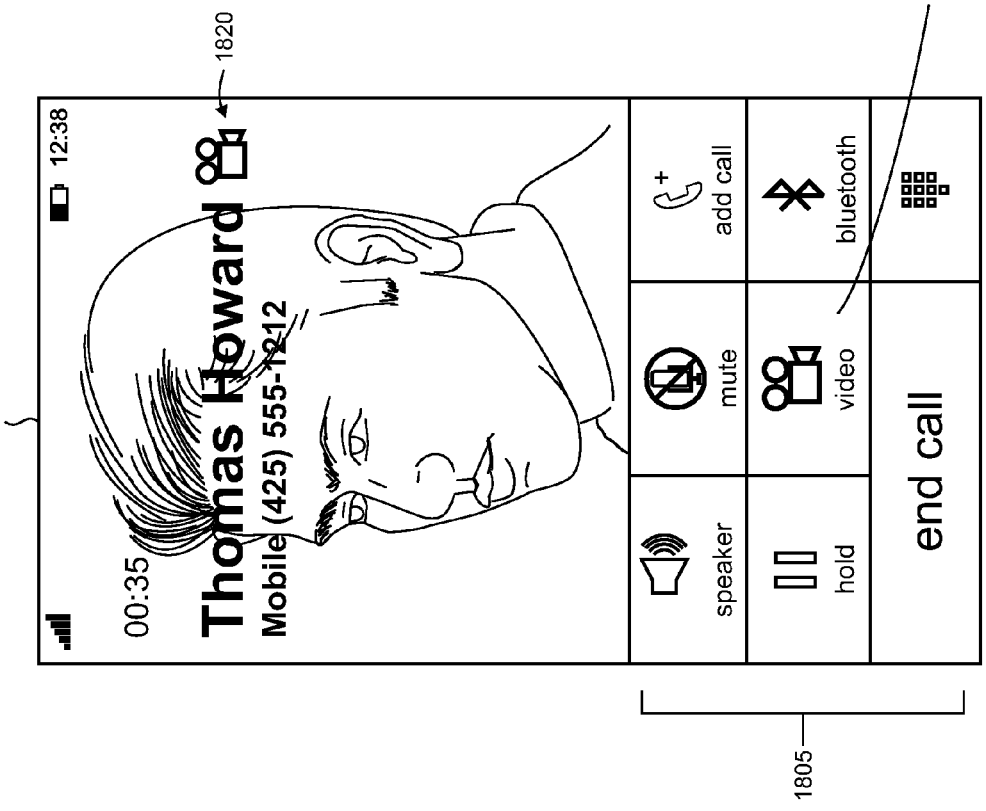

As shown in the UI 1800 depicted in FIG. 18, the user 105 has placed a call to the contact named "Thomas Howard." The UI is arranged in this example to show the picture of the contact in enlarged view, the contact's phone number, the call duration in minutes and seconds, and a video glyph 1820 to indicate that the contact has video capability based on the retrieved status. The UI 1800 also exposes various call control features that may be invoked using buttons 1805 that are included towards the bottom of the UI. In alternative implementations, call control features can be invoked using voice command or non-touch gestures. In this illustrative example, a video button 1825 is included in the UI that can make the call a video call when invoked. By comparison, in the UI 1900 shown for the contact "Peter Yanovich" in FIG. 19, there is no video glyph displayed because the status for the contact indicates no video capability is currently supported. In addition, the video button 1925 is grayed out to indicate that the capability is unavailable (in alternative implementations, the button 1925 may not be displayed at all among the call control buttons).

Figure 20:
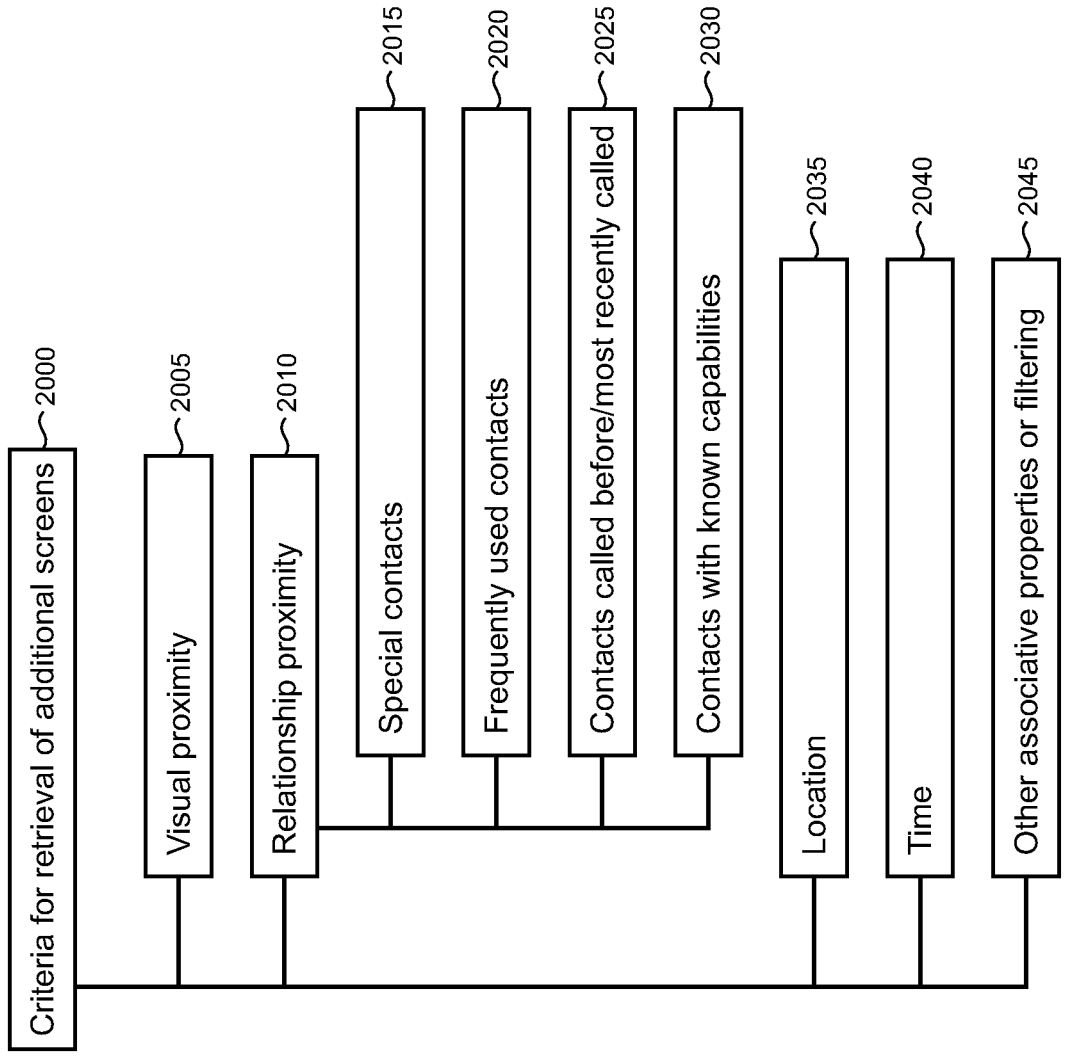
FIG. 20 shows an illustrative taxonomy of criteria that may be applied to retrieve additional screens of contact status.

FIG. 20 shows an illustrative taxonomy for criteria 2000 that may be applied when retrieving status for additional screens of contacts in a contact list, as discussed above. In some implementations, the visual proximity of other contacts to the currently displayed contacts in the list is utilized, as indicated by reference numeral 2005. In this case, the status for contacts that are close to the currently displayed contacts on the UI is retrieved. Thus, for example, in a UI which is designed for scrolling up and down to show contacts in alphabetical order, status for contacts in the one or more screens immediately above and below the currently displayed screen could be retrieved as it can be reasonably expected that the user may wish to scroll the UI to view those additional contacts.

The relationship proximity of contacts (indicated by reference numeral 2010) may also be used as criteria when retrieving status for contacts in additional screens. Here, the additional contacts are those that are proximate in relationship to the currently displayed contacts and can include special contacts 2015, frequently used contacts 2020, contacts called before or most recently called 2025, and contacts having known capabilities 2030. In some implementations an individual criterion may be used, or a mix of criteria can also be used, and not all criteria shown in FIG. 20 need to be used in every implementation.

Special contacts can include those that the user has designated or categorized on the mobile device as having special importance or belonging to a particular group. For example, such categories could include friends and family, colleagues, inner circle, favorites, and the like. So if one or more contacts shown in the currently displayed list have special importance or are members of a particular group, the background process 715 can pre-fetch status for other contacts that also have such properties. Similarly, if one or more contacts in the currently displayed list are among the user's most frequently used or accessed contacts, then other such contacts that are also frequently used or accessed can be pre-fetched for display in additional screens. What constitutes frequently used in this particular context can vary by implementation. If the one or more contacts in the currently displayed list have been called before and/or have been among the most recently called contacts, then other contacts having similar properties can be pre-fetched for display in additional screens. What constitutes most recently called in this particular context can vary by implementation. If one or more contacts having known capabilities (e.g., the contact is known to have video capability through application of heuristics to the status data as described above) are shown in the currently displayed list, the other contacts having similar or the same capabilities can be pre-fetched for display in additional screens.

The additional screen retrieval criteria 2000 can further include location 2035 and time 2040 and also take into account various other associative properties of contacts or filtering 2045. The location criteria 2035 can take into account a location of mobile device associated with a contact so that, for example, status can be pre-fetched for other contacts that are in the same city as a contact that is currently displayed in a list (where the location boundaries in this context can vary by implementation). The time criteria 2040 can take into account the current time for a mobile device associated with a user. So, for example, status can be pre-fetched for other contacts that share the same time zone as a contact that is currently displayed in a list (where the time boundaries in this context can vary by implementation).

As noted above the additional screen retrieval criteria 2000 can be used individually or in combination. Thus, status can be pre-fetched only for contacts that meet several criteria. For example, status can be pre-fetched for contacts that are members of the user's frequently called numbers and are located in the same city as a contact that is currently shown in a list that is displayed on a mobile device.

Figure 21:
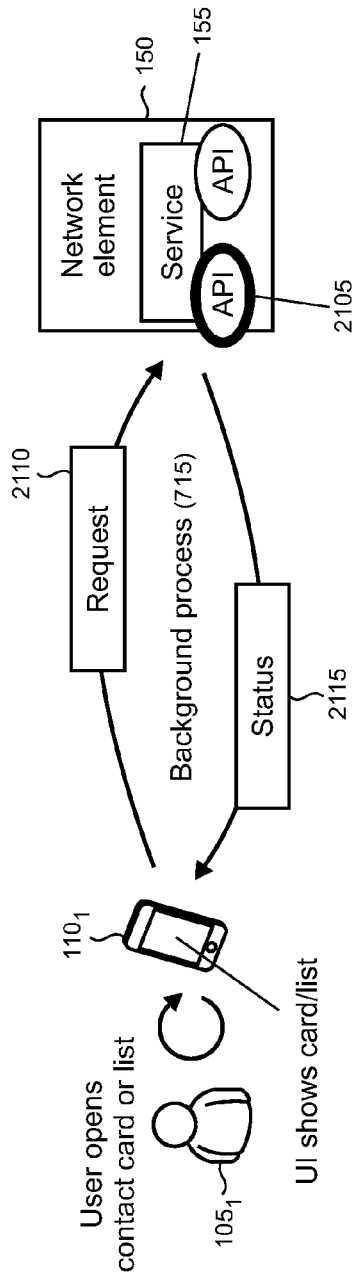
FIGS. 21 and 22 show public application programming interfaces (APIs) that may be exposed by a service for facilitating status retrieval under the on demand model.
Figure 22:
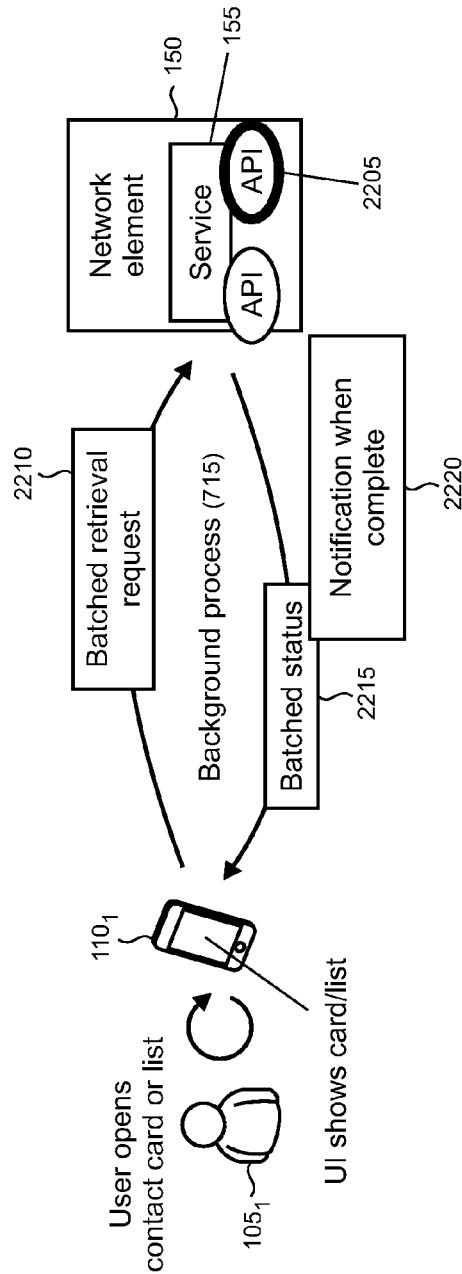

The retrieval in lists with APIs option 1125 discussed above in conjunction with FIG. 11 uses a method that is substantially similar to that described for method 1500 above and shown in FIG. 15. The difference is that the retrieval in lists with APIs option uses a method that interfaces with several public APIs. In an illustrative example, the public APIs are exposed by the service 155 as shown in FIGS. 21 and 22. In FIG. 21, a first of the public APIs 2105 is configured to respond to a request 2110 with status 2115 for one number/contact at a time. When status is received at the mobile device 110, it may trigger additional requests which can be delayed in some cases in order to place them closer in time in a pseudo-batch manner so that radio initialization overhead costs are shared among multiple requests.

In FIG. 22, a second of the public APIs 2205 is configured to respond to batched retrieval requests 2210 with batched status 2215 for multiple contacts/numbers at a time. A notification 2220 is also sent by the service 155 when the status update to the mobile device 110 is complete. In typical implementations in which contact lists are shown on the UI of the mobile device 110, it is anticipated that the second public API 2205 would be utilized by the background process 715 to retrieve status updates due to resource savings that are enabled through the batched processing. When a single contact card is accessed, then the first public API 2105 could be used without incurring a resource penalty.

Figure 23:
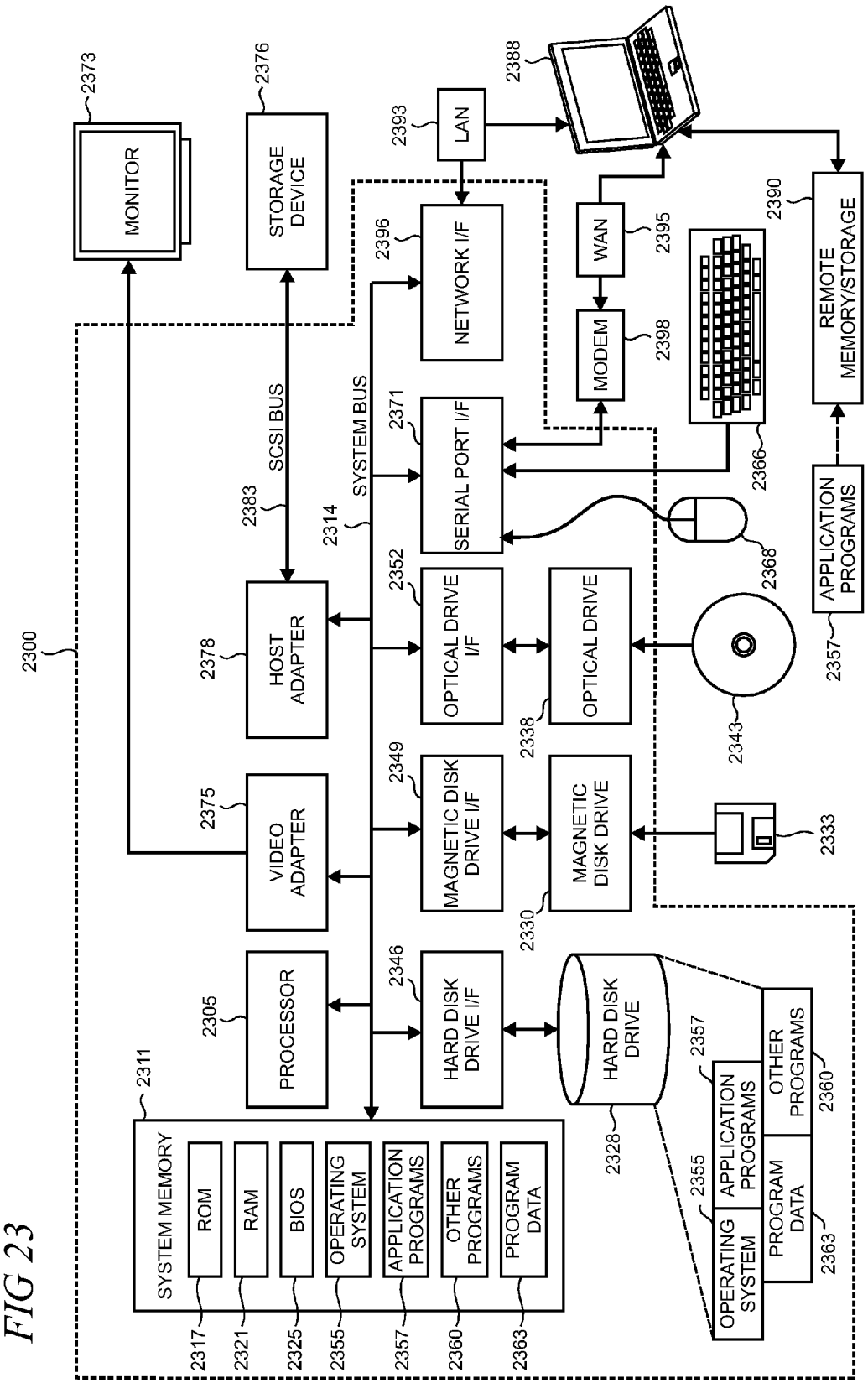
FIG. 23 is a simplified block diagram of an illustrative computer system such as a personal computer (PC) that may be used in part to implement the present video capabilities retrieval.

FIG. 23 is a simplified block diagram of an illustrative computer system 2300 such as a personal computer (PC), client machine, or server with which the present video capability retrieval may be implemented in some applications. Computer system 2300 includes a processor 2305, a system memory 2311, and a system bus 2314 that couples various system components including the system memory 2311 to the processor 2305. The system bus 2314 may be any of several types of bus structures including a memory bus or memory controller, a peripheral bus, or a local bus using any of a variety of bus architectures. The system memory 2311 includes read only memory (ROM) 2317 and random access memory (RAM) 2321. A basic input/output system (BIOS) 2325, containing the basic routines that help to transfer information between elements within the computer system 2300, such as during startup, is stored in ROM 2317. The computer system 2300 may further include a hard disk drive 2328 for reading from and writing to an internally disposed hard disk (not shown), a magnetic disk drive 2330 for reading from or writing to a removable magnetic disk 2333 (e.g., a floppy disk), and an optical disk drive 2338 for reading from or writing to a removable optical disk 2343 such as a CD (compact disc), DVD (digital versatile disc), or other optical media. The hard disk drive 2328, magnetic disk drive 2330, and optical disk drive 2338 are connected to the system bus 2314 by a hard disk drive interface 2346, a magnetic disk drive interface 2349, and an optical drive interface 2352, respectively. The drives and their associated computer-readable storage media provide non-volatile storage of computer-readable instructions, data structures, program modules, and other data for the computer system 2300. Although this illustrative example includes a hard disk, a removable magnetic disk 2333, and a removable optical disk 2343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present video capability retrieval. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk 2328, magnetic disk 2333, optical disk 2343, ROM 2317, or RAM 2321, including an operating system 2355, one or more application programs 2357, other program modules 2360, and program data 2363. A user may enter commands and information into the computer system 2300 through input devices such as a keyboard 2366 and pointing device 2368 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 2305 through a serial port interface 2371 that is coupled to the system bus 2314, but may be connected by other interfaces, such as a parallel port, game port, or universal serial bus (USB). A monitor 2373 or other type of display device is also connected to the system bus 2314 via an interface, such as a video adapter 2375. In addition to the monitor 2373, personal computers typically include other peripheral output devices (not shown), such as speakers and printers. The illustrative example shown in FIG. 23 also includes a host adapter 2378, a Small Computer System Interface (SCSI) bus 2383, and an external storage device 2376 connected to the SCSI bus 2383.

The computer system 2300 is operable in a networked environment using logical connections to one or more remote computers, such as a remote computer 2388. The remote computer 2388 may be selected as another personal computer, a server, a router, a network PC, a peer device, or other common network node, and typically includes many or all of the elements described above relative to the computer system 2300, although only a single representative remote memory/storage device 2390 is shown in FIG. 23. The logical connections depicted in FIG. 23 include a local area network (LAN) 2393 and a wide area network (WAN) 2395. Such networking environments are often deployed, for example, in offices, enterprise-wide computer networks, intranets, and the Internet.

When used in a LAN networking environment, the computer system 2300 is connected to the local area network 2393 through a network interface or adapter 2396. When used in a WAN networking environment, the computer system 2300 typically includes a broadband modem 2398, network gateway, or other means for establishing communications over the wide area network 2395, such as the Internet. The broadband modem 2398, which may be internal or external, is connected to the system bus 2314 via a serial port interface 2371. In a networked environment, program modules related to the computer system 2300, or portions thereof, may be stored in the remote memory storage device 2390. It is noted that the network connections shown in FIG. 23 are illustrative and other means of establishing a communications link between the computers may be used depending on the specific requirements of an application of the present video capability retrieval.

Figure 24:
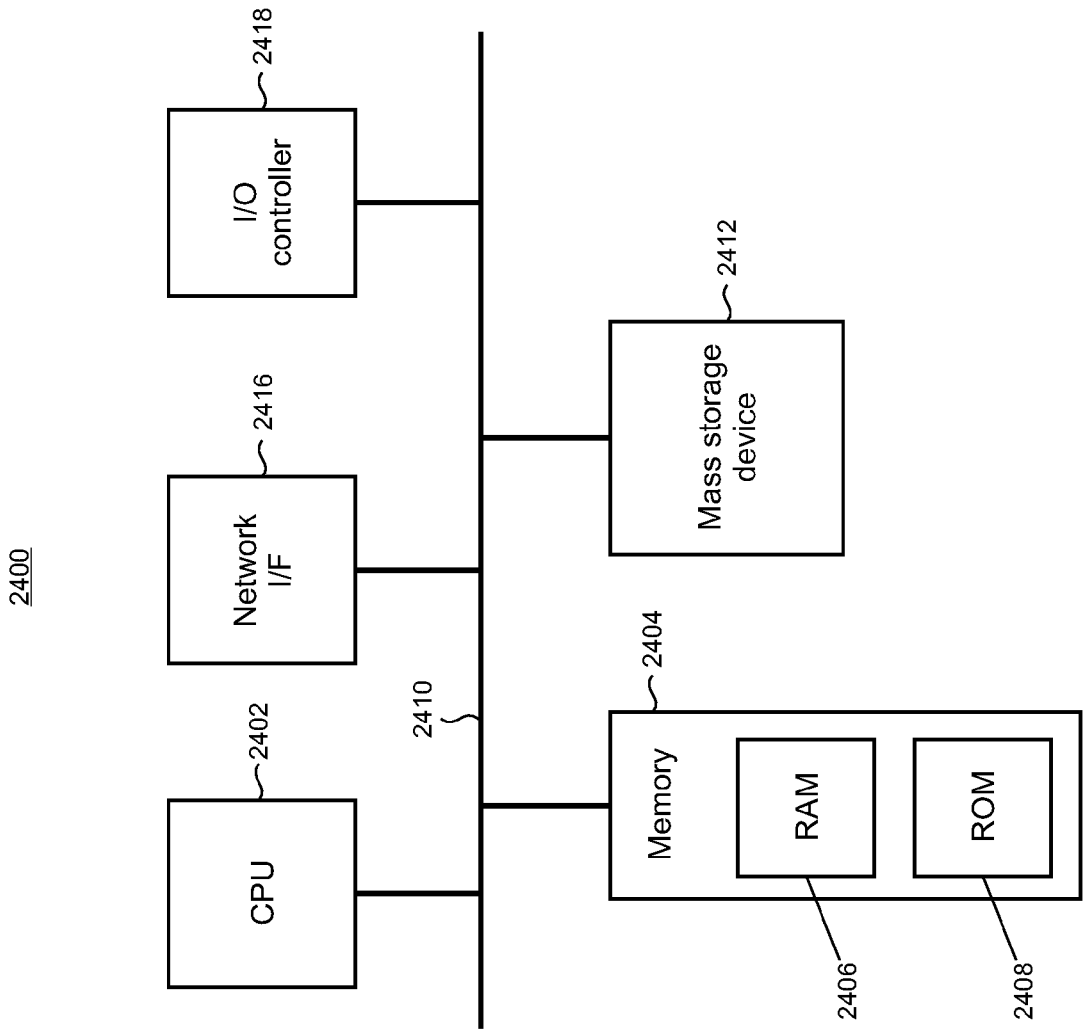
FIG. 24 shows a block diagram of an illustrative device that may be used in part to implement the present video capabilities retrieval.

FIG. 24 shows an illustrative architecture 2400 for a device capable of executing the various components described herein for providing the present video capability retrieval. Thus, the architecture 2400 illustrated in FIG. 24 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 2400 may be utilized to execute any aspect of the components presented herein.

The architecture 2400 illustrated in FIG. 24 includes a CPU 2402, a system memory 2404, including a RAM 2406 and a ROM 2408, and a system bus 2410 that couples the memory 2404 to the CPU 2402. A basic input/output system containing the basic routines that help to transfer information between elements within the architecture 2400, such as during startup, is stored in the ROM 2408. The architecture 2400 further includes a mass storage device 2412 for storing software code or other computer-executed code that is utilized to implement applications, the file system, and the operating system.

The mass storage device 2412 is connected to the CPU 2402 through a mass storage controller (not shown) connected to the bus 2410. The mass storage device 2412 and its associated computer-readable storage media provide non-volatile storage for the architecture 2400.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2400.

According to various embodiments, the architecture 2400 may operate in a networked environment using logical connections to remote computers through a network. The architecture 2400 may connect to the network through a network interface unit 2416 connected to the bus 2410. It should be appreciated that the network interface unit 2416 also may be utilized to connect to other types of networks and remote computer systems. The architecture 2400 also may include an input/output controller 2418 for receiving and processing input from a number of other devices, including a keyboard, mouse, or electronic stylus (not shown in FIG. 24). Similarly, the input/output controller 2418 may provide output to a display screen, a printer, or other type of output device (also not shown in FIG. 24).

It should be appreciated that the software components described herein may, when loaded into the CPU 2402 and executed, transform the CPU 2402 and the overall architecture 2400 from a general-purpose computing system into a special-purpose computing system customized to facilitate the functionality presented herein. The CPU 2402 may be constructed from any number of transistors or other discrete circuit elements, which may individually or collectively assume any number of states. More specifically, the CPU 2402 may operate as a finite-state machine, in response to executable instructions contained within the software modules disclosed herein. These computer-executable instructions may transform the CPU 2402 by specifying how the CPU 2402 transitions between states, thereby transforming the transistors or other discrete hardware elements constituting the CPU 2402.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2400 in order to store and execute the software components presented herein. It also should be appreciated that the architecture 2400 may include other types of computing devices, including handheld computers, embedded computer systems, smartphones, PDAs, and other types of computing devices known to those skilled in the art. It is also contemplated that the architecture 2400 may not include all of the components shown in FIG. 24, may include other components that are not explicitly shown in FIG. 24, or may utilize an architecture completely different from that shown in FIG. 24.

Figure 25:
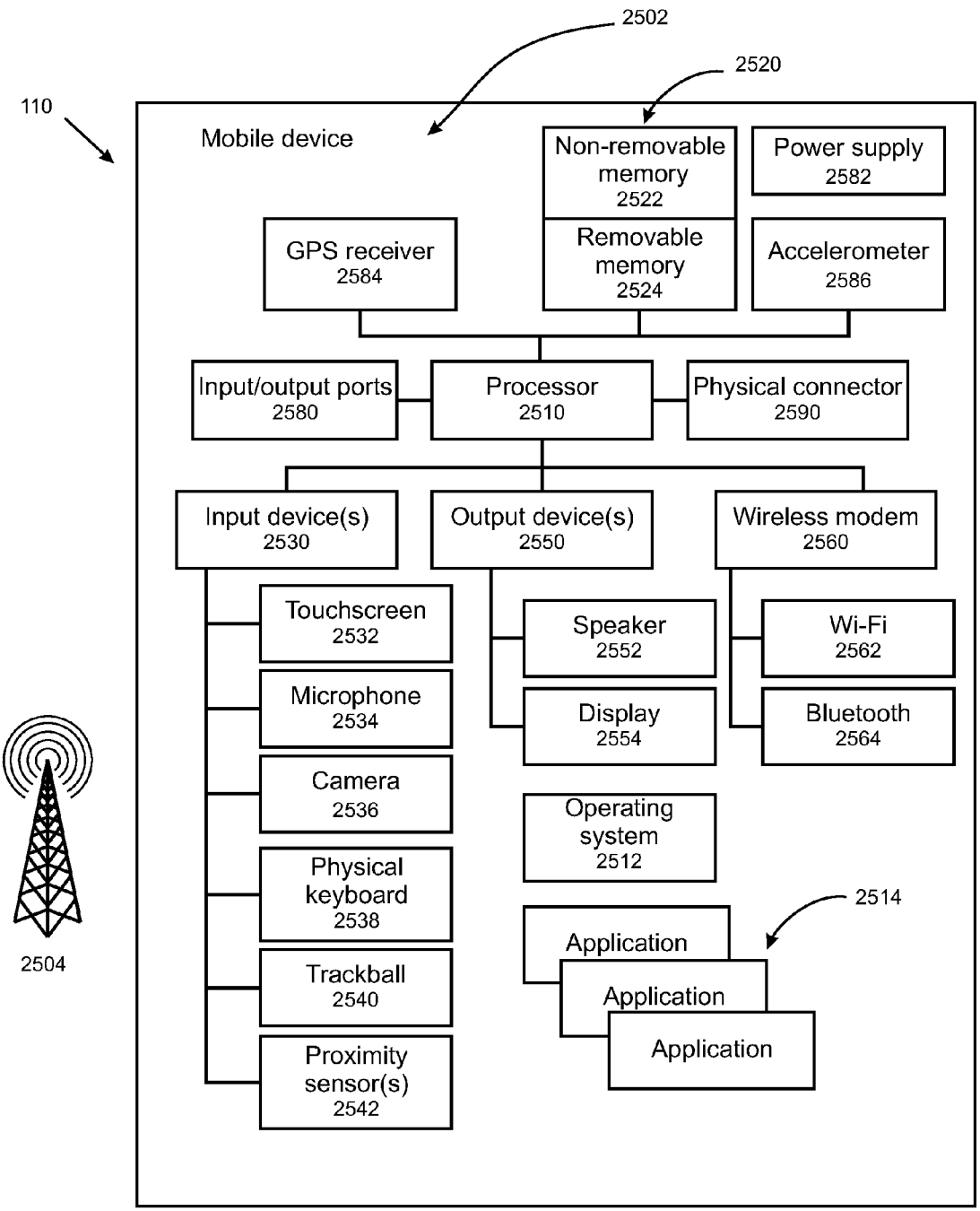
FIG. 25 is a block diagram of an illustrative mobile device.

FIG. 25 is a functional block diagram of an illustrative mobile device 110 such as a mobile phone or smartphone including a variety of optional hardware and software components, shown generally at 2502. Any component 2502 in the mobile device can communicate with any other component, although, for ease of illustration, not all connections are shown. The mobile device can be any of a variety of computing devices (e.g., cell phone, smartphone, handheld computer, Personal Digital Assistant (PDA), etc.) and can allow wireless two-way communications with one or more mobile communication networks 2504, such as a cellular or satellite network.

The illustrated mobile device 110 can include a controller or processor 2510 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2512 can control the allocation and usage of the components 2502, including power states, above-lock states, and below-lock states, and provides support for one or more application programs 2514. The application programs can include common mobile computing applications (e.g., image-capture applications, email applications, calendars, contact managers, web browsers, messaging applications), or any other computing application.

The illustrated mobile device 110 can include memory 2520. Memory 2520 can include non-removable memory 2522 and/or removable memory 2524. The non-removable memory 2522 can include RAM, ROM, Flash memory, a hard disk, or other well-known memory storage technologies. The removable memory 2524 can include Flash memory or a Subscriber Identity Module (SIM) card, which is well known in GSM (Global System for Mobile communications) systems, or other well-known memory storage technologies, such as "smart cards." The memory 2520 can be used for storing data and/or code for running the operating system 2512 and the application programs 2514. Example data can include web pages, text, images, sound files, video data, or other data sets to be sent to and/or received from one or more network servers or other devices via one or more wired or wireless networks.

The memory 2520 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 2520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 2530; such as a touch screen 2532; microphone 2534 for implementation of voice input for voice recognition, voice commands and the like; camera 2536; physical keyboard 2538; trackball 2540; and/or proximity sensor 2542; and one or more output devices 2550, such as a speaker 2552 and one or more displays 2554. Other input devices (not shown) using gesture recognition may also be utilized in some cases. Other possible output devices (not shown) can include piezoelectric or haptic output devices. Some devices can serve more than one input/output function. For example, touchscreen 2532 and display 2554 can be combined into a single input/output device.

A wireless modem 2560 can be coupled to an antenna (not shown) and can support two-way communications between the processor 2510 and external devices, as is well understood in the art. The modem 2560 is shown generically and can include a cellular modem for communicating with the mobile communication network 2504 and/or other radio-based modems (e.g., Bluetooth 2564 or Wi-Fi 2562). The wireless modem 2560 is typically configured for communication with one or more cellular networks, such as a GSM network for data and voice communications within a single cellular network, between cellular networks, or between the mobile device and a public switched telephone network (PSTN).

The mobile device can further include at least one input/output port 2580, a power supply 2582, a satellite navigation system receiver 2584, such as a Global Positioning System (GPS) receiver, an accelerometer 2586, a gyroscope (not shown), and/or a physical connector 2590, which can be a USB port, IEEE 1394 (FireWire) port, and/or an RS-232 port. The illustrated components 2502 are not required or all-inclusive, as any component can be deleted and other components can be added.

Based on the foregoing, it should be appreciated that technologies for video capability retrieval have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed on a mobile device with a user interface (UI) and having access to a mobile broadband network, comprising:

receiving an input from a user for invoking display of a contact card or a contact list on the UI;

responsively to the input, sending a request to a remote service for current status of capabilities of devices respectively associated with each of the displayed contacts, the status describing capabilities of the devices to implement features or services supported by the mobile broadband network;

while waiting for the service to respond to the request, displaying a temporary UI to the user on the mobile device, the temporary UI showing the invoked contact card or contact list but without showing current status for the displayed contacts;

receiving the current status for a contact from the remote service; and applying a timestamp to the received current status, and throttling requests for current status to the remote service using the timestamp, wherein the timestamp is utilized to enable a current status for a contact to automatically expire at the end of a predetermined time interval, and wherein a status request will not be attempted during the predetermined time interval.

2. The method of claim 1 further including receiving the current status from the remote service and caching the status.

3. The method of claim 1 further including showing a most recently cached status on the temporary UI.

4. The method of claim 1 further including receiving the current status for a contact from the remote service and updating the UI with the received current status for the contact.

5. The method of claim 1 further including receiving the current status for a contact, the current status including a timestamp, and throttling requests for current status to the remote service using the timestamp so as to preserve life of a battery disposed in the mobile device.

6. The method of claim 1 in which the request for current status includes batched requests for status of capabilities for a plurality of devices.

7. A mobile device having connectivity to a mobile operator network, comprising:
one or more processors;
a display that supports a user interface (UI) for conveying information to a user of the mobile device; and
a memory device storing computer-readable instructions which, when executed by the one or more processors, perform a method comprising the steps of:
receiving an input from the user that invokes display of a list of contacts on the UI,
showing the list of contacts on a displayed screen on the UI responsively to the received input, the displayed screen showing a most recently cached status for each of the listed contacts,
sending a request to a remote service for current status of capabilities of devices respectively associated with each of the listed contacts displayed on the displayed screen,
updating the displayed screen with the current status for each of the listed contacts displayed on the displayed screen when the current status is received from the remote service,
pre-fetching status from the remote service for contacts in additional screens that are displayable on the UI, the contacts in the additional screens having a contextual relationship to the contacts shown in the current screen,
displaying one or more additional screens of contacts including the pre-fetched status responsively to user input to view additional screens,
applying a timestamp to the received current status, and throttling requests for current status to the remote service using the timestamp,
wherein the timestamp is utilized to enable a current status for a contact to automatically expire at the end of a predetermined time interval, and
wherein a status request will not be attempted during the predetermined time interval.

8. The mobile device of claim 7 in which the mobile operator network comprises a mobile broadband network.

9. The mobile device of claim 7 in which the user input is associated with utilization of a dialer application.

10. The mobile device of claim 7 in which the capabilities include at least availability of a device to render streaming video transmitted over an LTE (Long Term Evolution) mobile broadband network.

11. The mobile device of claim 7 in which the contextual relationship is one of visual proximity, relationship proximity, location, time, or associative property.

12. The mobile device of claim 11 in which the relationship proximity includes contacts in the current screen and contacts in the additional screens sharing membership in one of special contacts, frequently used contacts, most recently called contacts, contacts called before, or contacts having known capabilities.

13. The mobile device of claim 7 further including applying one or more heuristics to data included in the received status to make inferences as to capabilities of a device to which the received status is associated.

14. A method, by a remote service, for providing a service that returns capabilities status in response to a request from a mobile device, comprising: receiving a request for current status from a mobile device having connectivity to a mobile broadband network, the current status indicating capabilities of devices respectively associated with contacts shown in a list on a user interface (UI) supported by the mobile device, wherein the current status includes an indication of devices abilities to implement features or services supported by a mobile broadband network, the features or services being related to video consumption or video rendering; in response to the request for current status for a contact by the mobile device, sending the current status to the mobile device, where the current status includes a timestamp generated by the remote service, operable to throttle requests for current status to the remote service using the timestamp by the mobile device, wherein the timestamp is utilized to enable a current status for a contact to automatically expire at the end of a predetermined time interval, and wherein a status request will not be attempted during the predetermined time interval; receiving a request for pre-fetching additional status from the mobile device, the additional status pertaining to contacts in additional screens that are displayable on the UI in response to user input; and in response to the request pre-fetching additional status, sending the additional status to the mobile device.

15. The method of claim 14 in which the service is exposed by a network element disposed in a mobile broadband network.

16. The method of claim 14 further including exposing an application programming interface configured for fulfilling status requests for a single contact per request.

17. The method of claim 14 further including exposing an application programming interface configured for fulfilling status requests on a batched request basis.

18. The method of claim 17 further including sending a notification when status responsive to the batched request is fulfilled.

* * * * *